United States Patent
Pan (10) Patent No.: US 9,290,128 B2
(45) Date of Patent: Mar. 22, 2016

(54) MULTI-FUNCTIONAL VEHICLE REARVIEW MIRROR

(76) Inventor: Lei Pan, Shenzhen (CN)

(*) Notice: Subject to any disclaimer, the term of this patent is extended or adjusted under 35 U.S.C. 154(b) by 465 days.

(21) Appl. No.: 13/878,736

(22) PCT Filed: Apr. 13, 2012

(86) PCT No.: PCT/CN2012/073986
§ 371 (c)(1),
(2), (4) Date: Apr. 10, 2013

(87) PCT Pub. No.: WO2013/063903
PCT Pub. Date: May 10, 2013

(65) Prior Publication Data
US 2013/0307984 A1 Nov. 21, 2013

(30) Foreign Application Priority Data
Oct. 31, 2011 (CN) .................. 2011 2 0436751 U (51) Int. Cl.
*B60R 1/12* (2006.01)
*G09F 9/35* (2006.01)
*G09F 23/00* (2006.01)

(52) U.S. Cl.
CPC ... *B60R 1/12* (2013.01); *G09F 9/35* (2013.01); *G09F 23/00* (2013.01); *B60R 2001/1215* (2013.01); *B60R 2300/70* (2013.01)

(58) Field of Classification Search
CPC .............. B60R 1/12; B60R 2001/1215; B60R 2300/70; G09F 23/00; G09F 9/35
USPC ........................................................ 348/148
See application file for complete search history.

(56) References Cited

U.S. PATENT DOCUMENTS

| 8,237,909 | B2* | 8/2012 | Ostreko | B60R 1/12 349/1 |
|---|---|---|---|---|
| 9,019,091 | B2* | 4/2015 | McCarthy | B60R 1/12 340/425.5 |
| 2008/0077882 | A1* | 3/2008 | Kramer | B60K 35/00 715/810 |
| 2009/0015736 | A1* | 1/2009 | Weller | B60R 1/12 349/11 |
| 2009/0096937 | A1* | 4/2009 | Bauer | B60R 1/12 348/739 |
| 2010/0201816 | A1* | 8/2010 | Lee | B60R 1/12 348/148 |
| 2010/0201896 | A1* | 8/2010 | Ostreko | B60R 1/12 349/1 |
| 2010/0253494 | A1* | 10/2010 | Inoue | G01C 21/36 340/436 |
| 2013/0321496 | A1* | 12/2013 | Weller | G02B 6/0078 345/694 |
| 2014/0022390 | A1* | 1/2014 | Blank | B60R 1/12 348/148 |

* cited by examiner

Primary Examiner — Anner Holder
(74) Attorney, Agent, or Firm — Novoclaims Patent Services LLC; Mei Lin Wong (57) ABSTRACT

A multi-functional vehicle rearview mirror that includes a cover, a glass reflecting mirror face, a large sized liquid crystal display device which includes a large sized display screen and a large sized display driver board, wherein the large sized display screen includes a large sized displaying liquid crystal glass and a large sized display device backlight module, wherein the large sized liquid crystal display device is provided with a retention frame and a high obscuration media, wherein a small window with a small sized backlight module and a control circuit is provided. The rearview mirror automatically shifts between multiple cameras via signals from vehicle lamps. The RF modules with little power consumption are embedded into the circuits of the rearview mirror and the cameras for providing the video shift and information communication of the whole system.

8 Claims, 5 Drawing Sheets

MULTI-FUNCTIONAL VEHICLE REARVIEW MIRROR

BACKGROUND OF THE PRESENT INVENTION

1. Field of Invention

The present invention relates to the technical field of auto parts, and more particularly to a multi-functional vehicle rearview mirror.

2. Description of Related Arts

A driver generally has the following requirements from a vehicle rearview mirror.

First of all, he or she wants to view each direction outside of the vehicle (i.e. the front, rear, left, and right sides of the vehicle) through an internal display of the rearview mirror, a freely and automatically shifting between a plurality of cameras is also desired. There are several problems difficult to be solved: one problem is the activation of the electric power of each camera and the cooperation between a video transmitting terminal and a video receiving terminal; another problem is that the wireless video transmitting module and the receiving module cannot maintain in the standby condition for a relatively long period of time, special vehicle lamp signal is also required for activating the video transmitting module and the receiving module of a predetermined direction. However, during an actual vehicle assembly process, the rear parts of the some of the vehicles are easy to be communicated to the signal of a reversing light while the front part of the vehicle is hard to have access to the signal of the reversing light. Therefore, a guide wire is provided to obtain the signal of the reversing light from the rear part of the vehicle for the display of the rearview mirror at the front part of the vehicle. The problem has been successfully solved by sending the signal of the reversing light to the rearview mirror at the front part of the vehicle by embedding with two RF transceiver modules.

A current rearview mirror of a car is embedded with a wireless video receiving module. If the wireless video receiving module is always kept in operation state, it is easy to be interfered by other proximal frequencies, so that the normal driving may be disturbed. Besides the wireless receiving module, the rearview mirror is further provided with a RF transceiver module which controls the electric power supply of the video receiving module. The rear part of the vehicle consists of three components which are a camera, a wireless video transmitting module, and a RF signal transceiver module. There are two methods for the electrical connection of the three components.

In one method, the three components are all electrically connected to the reversing light, so that the reversing light will be automatically supplied with electric power when shifting into a reverse gear. When electric power is transferred from the reversing light to three components, the video transmitting module will transmit the video information of the camera to outside, the RF module will send a signal to the RF receiving module within the rearview mirror of the vehicle so as to supply power to the video receiving module, so that the image information of the rear camera can be displayed on the display screen of the rearview mirror. A disadvantage of this method is that the driver has to shift into the reverse gear for viewing the situation at the rear side. Therefore, when the vehicle is running on a high way with a relatively high speed, the driver cannot view the situation at the rear side because the driver cannot shift the video image to the video image information provided by the camera at the rear side.

In another method, the ACC ignition wire and the reversing light are all electrically connected to a control system of the RF transceiver module at the rear part of the vehicle. When shifting into the reverse gear, the operation performance of the system is similar to the previous mentioned situation. When the vehicle cannot shifts into the reverse gear when running with a high speed and the driver does not want to shift into the reverse gear, if the driver wants to view the situation at the rear side of the vehicle, he can press on a RF transmitting controller near at hand, then a command can be received by the RF transceiver module adjacent to the camera, the RF transceiver module will send a signal to the RF receiving module of the rearview mirror so as to activate the video receiving and displaying system in the rearview mirror. At the same time, The RF transceiver module at the rear side of the vehicle switches on to supply power for the camera and the video transmitting module. Finally, the image information of the camera can be displayed on the display screen of the rearview mirror.

According to another aspect, during driving of the vehicle, the driver may also want to view information such as the information of the compass board, temperature information, incoming call information via Bluetooth, and the size of the display area should be as small as possible. That is because when this display area is used for displaying such information, it can be used for displaying view from the rear side of the vehicle. However, a relatively large area of the rearview mirror for displaying the view from the rear side of the vehicle is desired, so that a relative large view angel and vision can be increased so as to enhance the safety when driving. A special display device which is installed on the rearview mirror will add the cost of the product. Moreover, display screens with small size and high brightness are seldom manufactured by the manufacturer, so that the price may by even higher and the costs will be increased. The rearview mirror of a vehicle is often embedded with a display device with a size of 2.0 inches to 10.2 inches for viewing the video of the camera at the rear side of the vehicle or other DVD videos when the driver is backing the vehicle. The display device is not activated to operate when there is no backing operation of the vehicle. The working principle of the display device is described as follows: the activation board of the display device sends a display signal to the displaying liquid crystal glass, simultaneously other luminous beams are projected on the displaying liquid crystal glass, so that images can be viewed by eyes of the driver, so that the displaying function is provided. The projecting luminous beams on the displaying liquid crystal glass can be projected from the backlight module of the display device or from a backlight module of a small size. An window can be provided at the rear side of the display device in the rearview mirror for adding a backlight of a small size, when the backlight of the display device is closed and the displaying liquid crystal glass of the display device is activated, there will be graphics and text information shown on the export window, other areas is provided with black image. Simultaneously, the small sized backlight is projecting light beams which pass through the small window provided at the rear side of the display device in the rearview mirror and project on the displaying liquid crystal glass, so that an image displaying area of a relatively small size can be clearly viewed by the driver. Therefore, a displaying effect is provided on a very small sized screen on the rearview mirror of the vehicle during driving. Therefore, a display device not only can be used as a small sized displaying device when driving, but also can be used as the displaying device for cameras during backing of the vehicle or displaying DVD signals of DVD videos. Thus, the hardware is provided with two functions, the costs are reduced, but the size of the reflecting area of the rearview mirror is maximized.

Figure 1:
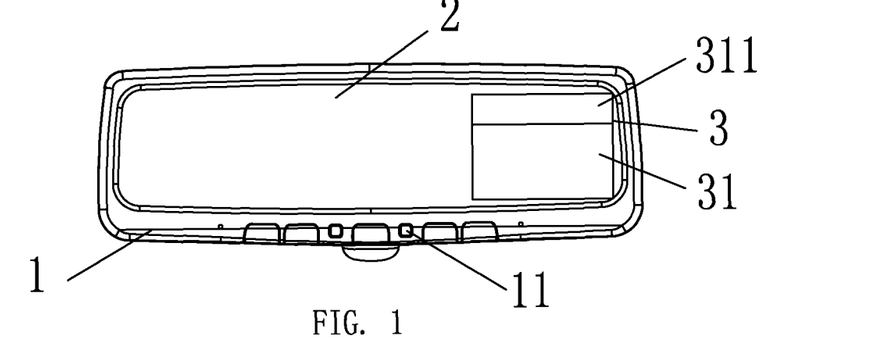
FIG. 1 is a schematic view of a conventional product.

Referring to FIG. 1, a conventional multi-functional rearview mirror includes a cover 1, a mirror 2 installed in the cover, a liquid crystal display device 3 which has a LCD 31 and a backlight (not shown in the drawings). LCD 31 is provided with a small sized display zone 311. In this type of multi-functional rearview mirror, the backlight of the liquid crystal display device is turned on when a full screen display effect is required for displaying the information from the camera during backing of the vehicle or displaying DVD videos. When some graphics and text information is required to be displayed on the small sized display zone on the rearview mirror when the vehicle is running forward. Since the small sized display zone 311 will not cover the whole screen, according to conventional art, other zones of the screen besides the small sized display zone 311 will be provided with backlight illumination. Even if the other zones are used for exporting back images, some luminous beams may be viewed from the other zones, so that it is not pleasing to eyes and the safe driving may not be guaranteed. The solution herein is that the backlight of the display device is turned off when the small sized zone is used to display information, and the added small sized backlight is turned on so that other zones of the display device is cut off from light source and will be completely dark, so that there will be no light beams which can pass glass and be viewed by the driver.

SUMMARY OF THE PRESENT INVENTION

In order to solve the problem mentioned above, the present invention provides a multi-functional vehicle rearview mirror comprising a cover, a glass reflecting mirror face provided in the cover, a large sized liquid crystal display device which includes a large sized display screen and a large sized display driver board, wherein the large sized display screen includes a large sized displaying liquid crystal glass and a large sized display device backlight module, wherein the large sized liquid crystal display device is provided with a retention frame and a high obscuration media at a rear side thereof, wherein a small window is provided on the retention frame and the high obscuration media, wherein the window is provided with a small sized backlight module and a control circuit at a rear side thereof.

The shape and size of the backlight face of the small sized backlight module is similar to the shape and size of the small window, wherein an illumination face of the small sized module is firmly attached to the rear side of the large sized display device through the small window.

The small sized backlight is provided with a media with high uni-directional luminousness and high uni-directional reflectivity.

A face of the rearview mirror which is adjacent to the eyes of the driver is provided with a rear light sensor, wherein a face which is adjacent to a windshield of the vehicle is provided with a front light sensor.

The glass reflecting mirror face is injected with LCD in an interior thereof or is made of dyeing crystal material.

The rearview mirror is provided with a RF transceiver module, wherein the RF transceiver module achieves a RF control and exchanges information with a RF transceiver module in a camera of the vehicle via a RF controller.

The rearview mirror is embedded with two direction-adjustable cameras at a rear part thereof for DVR shooting and recording.

The rearview mirror is provided with a video control arrangement including a vehicle lamp signal sensing module, a video shift module, a RF control module, a vehicle body camera module, a video composing module for full view during reversing of the vehicle, display screen module and a control center module, wherein the video control arrangement automatically shifts video channels through sensing a upper beam headlight, a left turning light, a right turning light and a vehicle reversing light of the vehicle.

Because of the introduction of the above mentioned structure, the rearview mirror of the present invention is provided with a small sized backlight at a rear side thereof, so that the rearview mirror is provided with a small sized backlight besides a large sized display device. The multiple functions of the display screen of the rearview mirror are achieved. The safe driving is not interfered and the present invention is also convenient to use. The aesthetic appearance of the vehicle rearview mirror is enhanced and the problem that the driving may be interfered by a strong backlight is also prevented.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description will illustrate an embodiment of the present invention in more details. It is expressly stated that the embodiment is exemplary only and not limiting.

Referring to FIGS. 1 to 5, a multi-functional vehicle rearview mirror includes a cover 1, a glass reflecting mirror face 2 provided in the cover 1, a large sized liquid crystal display device 3 which has a large sized display screen 31 and a large sized display driver board 32. The large sized display screen 31 includes a large sized displaying liquid crystal glass 311 and a large sized display device backlight module 312. The large sized liquid crystal display device 3 is provided with a retention frame 4 and a high obscuration media 5 at a rear side thereof. A small window 6 is provided on the retention frame 4 and the high obscuration media 5. The window 6 is provided with a small sized backlight module 7 and a control circuit 8 at a rear side thereof. The shape and size of the backlight face of the small sized backlight module 7 is similar to the shape and size of the small window 6. The illumination face of the small sized module 7 is firmly attached to the rear side of the large sized display device 3 through the small window 6.

Figure 2:
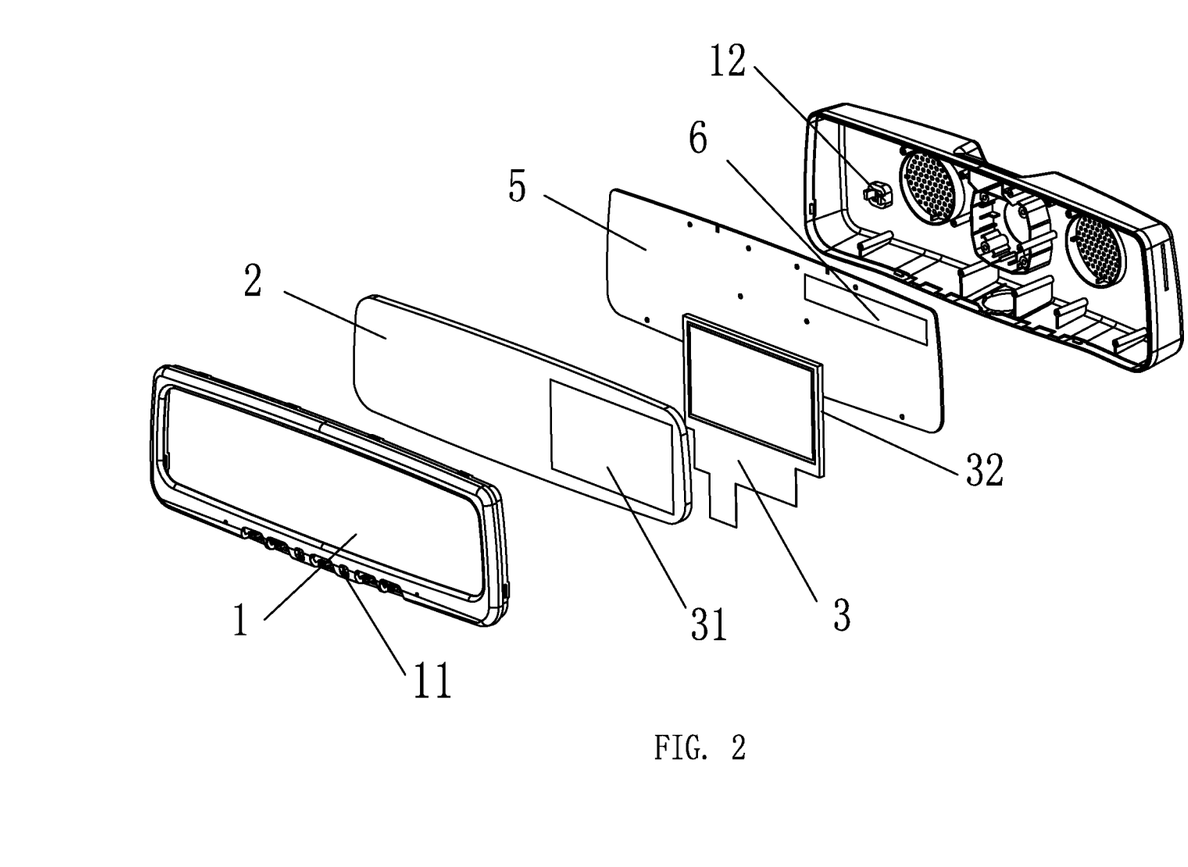
FIG. 2 is an exploded view of the present invention.
Figure 3:
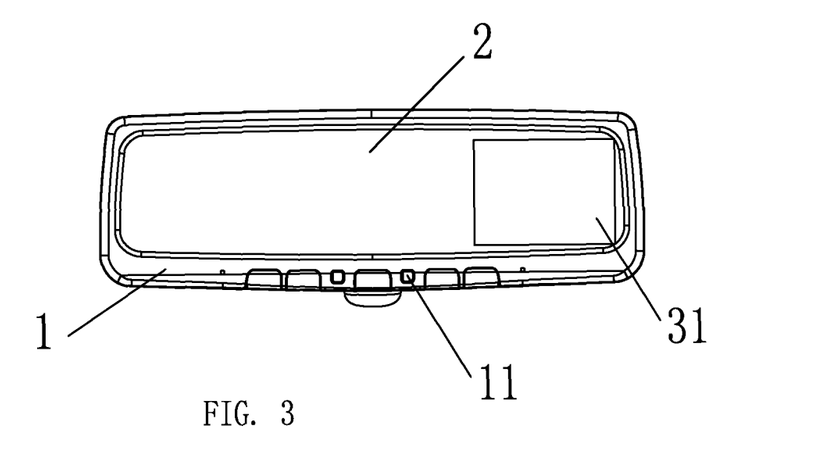
FIG. 3 is a schematic view of the present invention in a full screen displaying state.
Figure 4:
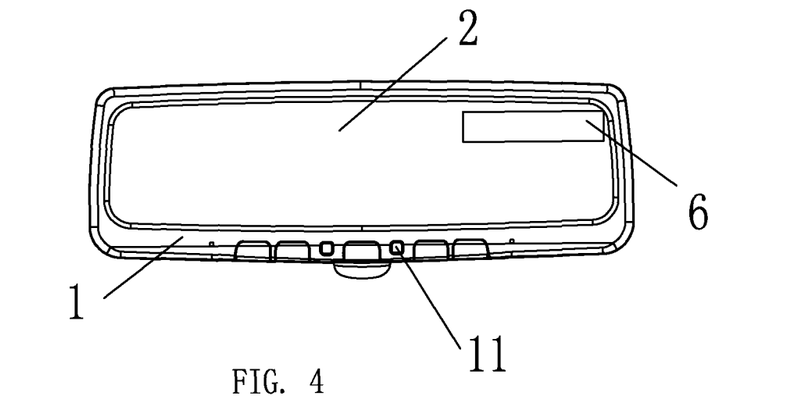
FIG. 4 is a schematic view of the present invention, wherein the information presentation zone is in a displaying state.
Figure 5:
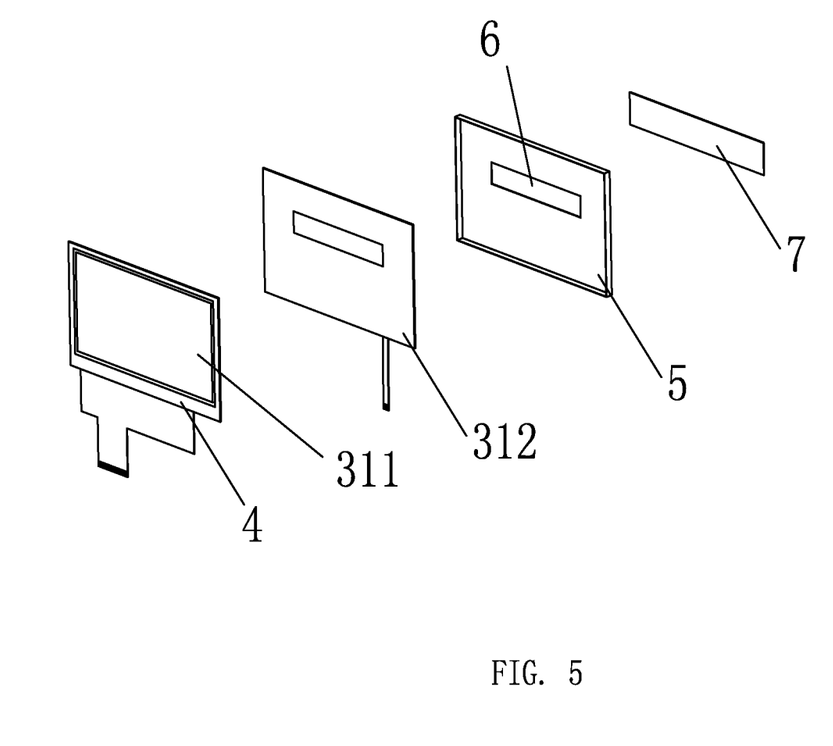
FIG. 5 is an exploded view of the liquid crystal display device of the present invention.

The working principle of the display device 3 is described in the following disclosure. The display driver board 32 sends a display signal to the displaying liquid crystal glass 311, simultaneously other luminous beams are projected on the displaying liquid crystal glass 311, so that images can be viewed by eyes of the driver, so that the displaying function is provided. The projecting luminous beams on the displaying liquid crystal glass 311 can be projected from the large sized display device backlight module 312 or from the small sized backlight module. The illumination face of the small sized module 7 is firmly attached to a predetermined zone at the rear side of the large sized display device 3. The high obscuration media 5 between the illumination face of small sized backlight and the displaying device liquid crystal glass 3 and the external retention frame of the large sized liquid crystal display device 3 are cut away and simultaneously preserve the small zone with low obscuration media, and thus a small window with a shape similar to a shape of the small sized backlight, which can transmit light, is formed in the display device. During a normal operation of the vehicle, the backlight of the display device is turned off. The large sized display driver board 32 still sends video signals to the displaying liquid crystal glass 311 so as to supply electric to the small sized backlight. The light beams from the small sized backlight pass through the small window 6 and project onto a predetermined zone of the displaying liquid crystal glass 311, so that a small sized image is provided on the predetermined zone of the displaying liquid crystal glass 311. The small sized image is achieved via the displaying liquid crystal glass of the display device and the additional small sized backlight. During driving, the small sized image can be used for displaying various image information such as information of compass, temperature information, incoming call via Bluetooth, mobile radar information, and information within the vehicle. In the image delivered from the display device, only the part which is provided with the small sized window can display the image information and the other zones are pure black image signals. The other zones are also not provided with backlight illumination, so that the rear sides of the other zones of the display device and other areas of the light reflecting mirror of the rearview mirror are completely black, so that only the area of the rearview mirror corresponding to the small sized backlight is provided with image, and other areas are used to provide normal function of a rearview mirror. Therefore, the driver is able to maximize the usage of the light reflecting face of the rearview mirror of the vehicle so as to ensure the safety of driving. During backing procedure of the vehicle or when the rearview mirror is about to display DVD information or other video images, the displaying liquid crystal glass of the display device will display images of the camera or DVD images. The backlight of the displaying liquid crystal glass of the display device is turned on, the small sized backlight is turned off or the brightness of the small sized backlight is adjusted, so that the whole liquid crystal display device will completely be in a normal operation state. Since the small portion of media which is corresponding to the small sized backlight is removed, there will be a little dim at this small zone when view the screen. There are three solutions for overcoming this disadvantage. In one method, this small zone can be added with a piece of media with high uni-directional luminousness and high uni-directional reflectivity, so that the light beams of the small sized backlight can effectively pass therethrough, simultaneously the light from the large sized backlight will be effectively reflected out so that the dim situation at the small zone can be significantly reduced; in another method, a whole layer of the large sized backlight which is most near to the small sized backlight uses a media with high uni-directional luminousness and high uni-directional reflectivity, so that the dimness problem at the small zone can be improved; in yet another method, the small sized backlight also projects light with a predetermined light intensity, so as to compensate for the dimness at the small zone. The above mentioned three methods can be independently used or used in combination, so that the dimness problem at this zone can be improved.

Referring to FIG. 2, the multi-functional vehicle rearview mirror of the present invention is respectively provided with light sensor at front and rear sides thereof. A face of the rearview mirror which is adjacent to the eyes of the driver is provided with a light sensor element which is called a rear light sensor 12, a direction which is adjacent to a windshield of the vehicle is provided with another light sensor which is defined as a front light sensor 11. The camera module includes a camera and related servo circuit. The display module includes a display driver board and a display liquid crystal screen. The mirror with varied reflectivity consists of three layers: a pure transparent glass at a face adjacent to the driver, a layer which is adjacent to the interior of the rearview mirror is layer of glass which is coated with a reflecting membrane of high reflectivity, the layer between the two above layers filled with media such as chemical colloid, liquid crystal, and dyeing liquid crystal. The above mentioned media is highly transparent when it is not electrified, so that light beams can pass therethrough and be reflected back. When the media is electrified, the luminousness of the media can be varied with the variation of the electrifying voltage or the electric current or the frequency. When the front light sensor senses a strong light during daytime with a high brightness, whether the rear light sensor senses any light or not, the reflectivity of the mirror with variable reflectivity in the rearview mirror will not be changed and will be maintained at the largest reflectivity. When the front light sensor senses a dim light when the vehicle is in dark night, if the rear light sensor senses that there is light beams from other vehicles from rear side projecting to the rearview mirror, the reflectivity of the mirror with variable reflectivity in the rearview mirror will be changed with a reverse proportion to the variation of the light beams projecting on the rearview mirror, i.e. the reflectivity will be decreased when the light intensity is increased, so that the driver is prevented from dazzling. When the vehicle is in a backing state, the vision at the rear side of the vehicle must be viewed clearly, the liquid crystal screen at the rear side of the light reflecting mirror of the rearview mirror with be displayed with backing image, so that the reflectivity of the mirror with variable reflectivity in the rearview mirror will be maintained at the largest reflectivity whatever the situation of the front and rear light sensor. The middle media layer of the mirror is in the most transparent state, so as to ensure that the image of the display device can be clearly projected out and be viewed by the driver. The image displayed by the liquid crystal screen may not be clear when the external light beams are too strong during daytime, and may be dazzling when the external light beams are dim during nighttime. Therefore, the front and rear light sensors are introduced to sense the light intensity and send signals to the display module so as to allow the display module to increase the backlight brightness of the liquid crystal screen, adjust parameters such as the contrast ratio, the colors chromaticity during daytime, so that the image can be easy to be viewed by the driver, and decrease the backlight brightness of the liquid crystal screen, adjust other parameters during nighttime, so that the image is not dazzling and can be clearly viewed by the driver. Considering the light intensity sensed by the front light sensor of the rearview mirror, electric signals are send to the camera module through the control circuit in the rearview mirror, the parameters of the camera are adjusted in response to the external light situation, so that clear picture shooting effect can be obtained.

Figure 6:
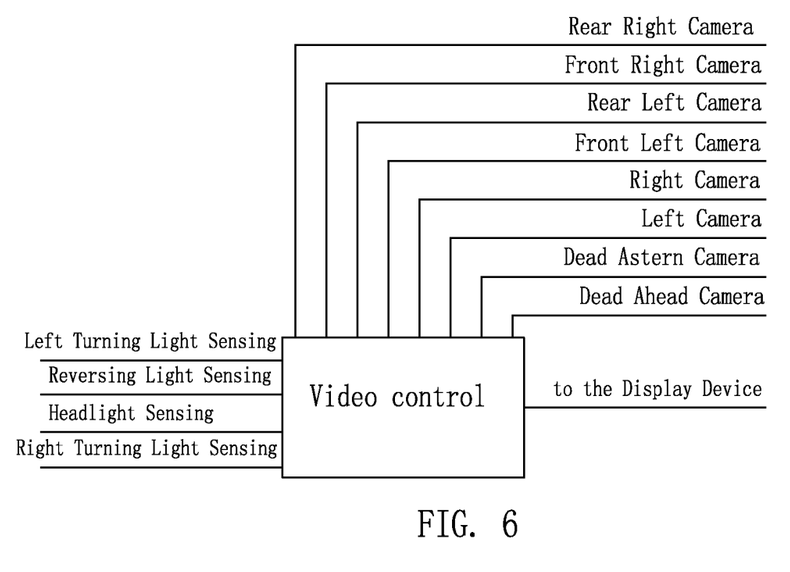
FIG. 6 is a schematic view showing the connection of a video control device.

As shown in FIG. 6, the multi-functional vehicle rearview mirror of the present invention is provided with a video control arrangement including a vehicle lamp signal sensing module, a video shift module, a RF control module, a vehicle body camera module, a video composing module for full view during reversing of the vehicle, display screen module, control center module. The vehicle body camera module includes a dead ahead camera, a dead astern camera, a front left camera, a rear left camera, a front right camera, a rear right camera, a left camera and a right camera. The vehicle lamp signal sensing module is used for sensing four types of signals which are the signals of a left turning flash light, a right turning flash light, an upper beam headlight flashing light and a reversing light. The signals are converted into stable and continual high and low level signals which are sent to the control center module. The flash light signals of the left turning flash light, right turning flash light are treated by the vehicle lamp signal sensing module and converted into stable high or low level signals which are sent to the control center module. During each flash of the upper beam headlight, the vehicle lamp signal sensing module will send a related signal to the control center module so that a shift between the high and low level signals takes place. In other words, when the current continual signal which is sent to the control center module by the vehicle lamp signal sensing module is a high level signal, if the upper beam headlight takes a next flash, the continual signal which is sent to the control center module will be changed into a low level signal, and then if the upper beam headlight takes a third flash, the continual signal which is sent to the control center module will be changed into a high level signal again, the process can be repeated. The video shift module control the shift between the video image from seven directions which are the front side, front left side, rear left side, front right side, rear right side, rear side, full view reversing view or other images according to the command from the control center module. During the shifting to the predetermined camera, the corresponding camera is also supplied with power. Or else, when any one of the camera is about to operate, all of the cameras are supplied with power, and when none of the cameras are in operation, all of the cameras are cut off from power supply. The RF control module is provide with a plurality of press buttons each is corresponding to a predetermined camera around the vehicle body, when a pressed button is pressed down, the video is automatically shifted to corresponding channel of the camera and the camera is also supplied with power so that the image of the corresponding camera is displayed on the display screen. When there is new button being pressed or there is a vehicle lamp signal, the current displaying state logs out and the current camera is shut off. The video composing module for full view during reversing of the vehicle is able to composing the images from the dead head camera, the dead astern camera, the left camera, the right camera or more images of other cameras into one integral image so as to form a full view revering image which can be displayed on the display screen. Considering the situation, the left and right cameras may be replaced by the front left and front right cameras, or the rear left and rear right cameras. The effect of the control center module is to receive the signals send from the RF control module or vehicle lamp signal sensing module, send a command to the video shift module, and supply power to related camera. The display module is used to display the image from the video shift module When revering the vehicle and the vehicle lamp sensing module has sensed the signal of the reversing lamp, the vehicle lamp sensing module will send a signal to the control center module which will then send a command to the video shift module so as to shift the video into the full view vehicle reversing image which is composed from cameras of four directions. If the upper beam headlight flashes for one time, the control center module will send a command to the video shift module so as to shift the video to the camera at the rear side of the vehicle. And if the upper beam headlight flashes again, the video will be shifted to the full view vehicle reversing image again, and will be shifted to the camera at the rear side of the vehicle if the headlight flashes again, and the process can be repeated as such. During reversing of the vehicle, if the driver wants to turn on the left turning light, the vehicle lamp sensing module will simultaneously send signals to the vehicle reversing light and the left turning light, the control center module will control the video shift module to shift the video to the image of the rear left camera. During reversing of the vehicle and turning on the right turning light, the video will be shifted to the image of the rear right camera. When the vehicle is going to turn left, the vehicle lamp sensing module will sense the flashing of the left turning light, the control center module will receive the signal from the vehicle lamp sensing module and send a command to the video shift module so as to shift the video to the image of the front left camera. If there is a right turning signal, the video will be shifted to the image of the front right camera. When the vehicle turns on the warning lamp, the turn signal lights at both two sides will flash, and the control center module will receive signals from the left and right turning light and send a command to the video shift camera so that the video will be shifted to the image of the dead ahead camera. When the video is displaying the image of the front left camera or the front right camera, if the vehicle headlight flash for one time, the vehicle lamp sensing module will send a signal to the control center module which will send a command to the video shift module, so that a shift between the image of the front left camera and the front right camera takes place. In other words, when the current video shows the image of the front left camera, if the headlight flashes once, the video will be shifted to the image of the front right camera, and if the headlight flashes again, the video will be shifted back to the image of the front left camera. When the related vehicle lamp signals disappear, the control center module will send a command to the video shift module so as to shut off the power of all cameras and all cameral channels. The above shifting method can conveniently use the reversing gear, left turning light, right turning light, flash headlight which are near at hand in the vehicle, so that the shift between the seven images which are the images of the dead ahead camera, the front left camera, the front right camera, the rear left camera, the rear right camera, the left camera, right camera, the dead astern camera, and the full view vehicle revering image is achieved. The operation is convenient, human friendly and easy to operate and control. Since the camera will produce heat after a relatively long period of operation and may be get out of order, so that the camera should not be electrified for a long period of time. In all of the above situations, when the video is going to be shifted to a predetermined camera, the control circuit will automatically supply power to the corresponding camera. Alternatively, for simplifying of the electric circuit, when one of the cameras is going to be in operation, all of the cameras are supplied with electric power.

Figure 7:
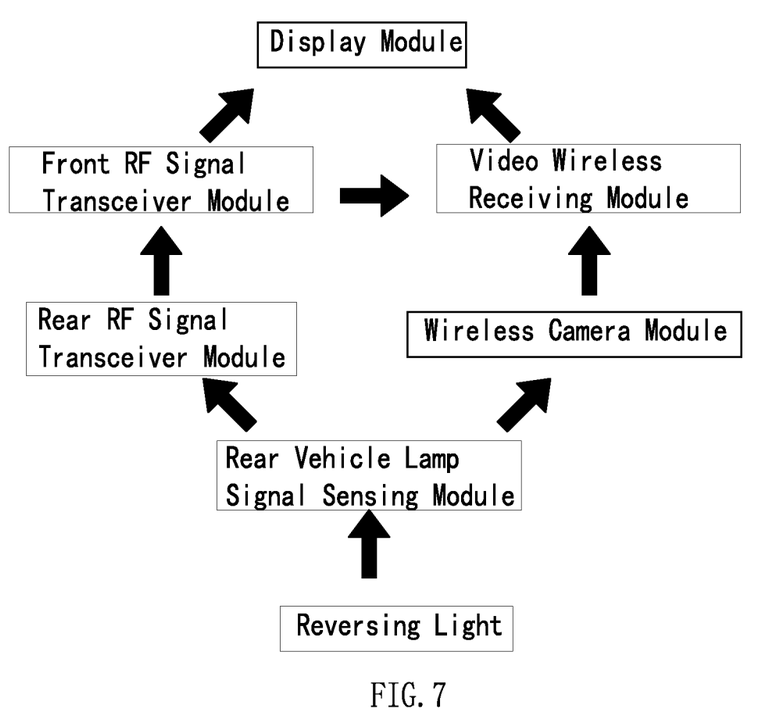
FIG. 7 is a first schematic view of the RF wireless camera device in the operation state of the present invention.
Figure 8:
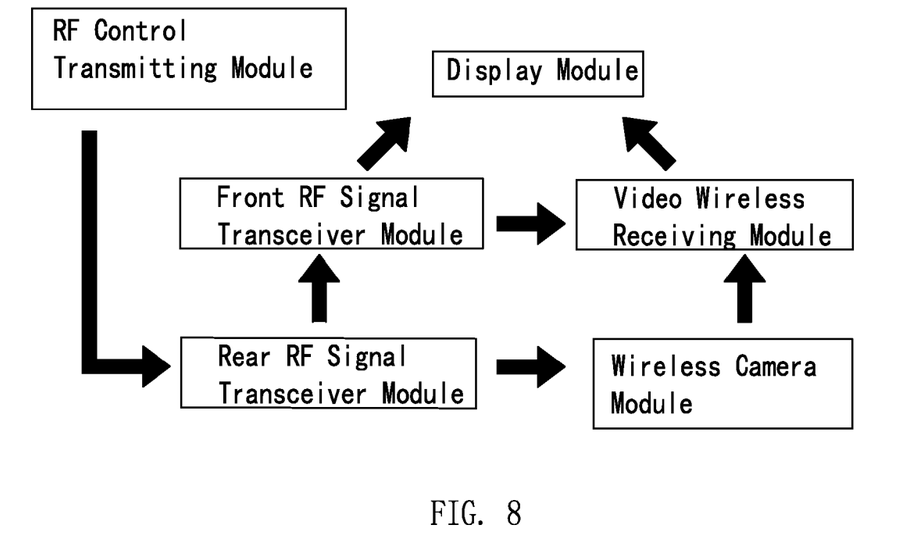
FIG. 8 is a second schematic view of the RF wireless camera device in the operation state of the present invention.
Figure 9:
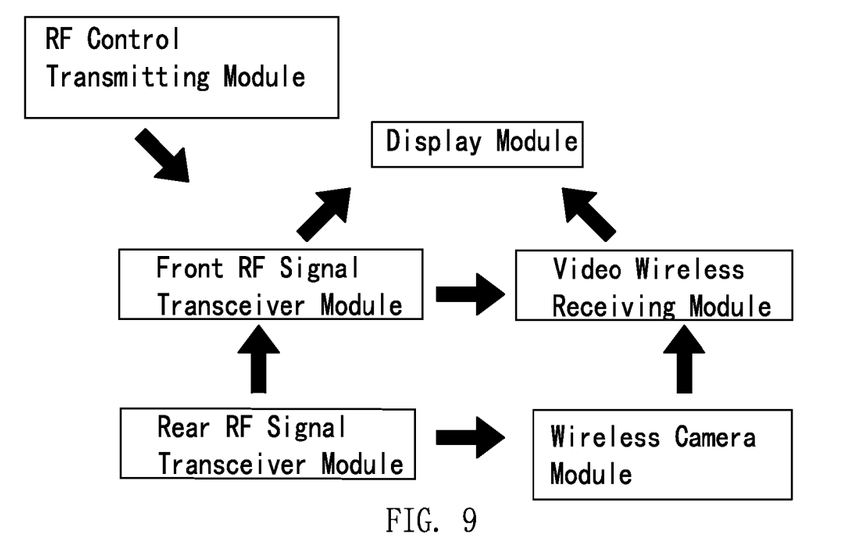
FIG. 9 is a third schematic view of the RF wireless camera device in the operation state of the present invention.

As shown in FIGS. 7-9, the multi-functional rearview mirror of the present invention is further provided with a wireless camera arrangement controlled via RF technology which includes two parts that are a front vehicle part and a rear vehicle part. The front vehicle part includes a RF control transmitting module, a display module, a front RF signal transceiver module. The rear vehicle part includes a rear vehicle lamp signal sensing module, a wireless camera module. In a first condition, as shown in FIG. 8, when the vehicle is reversing, the reversing light is turned on and the rear vehicle lamp signal sensing module will sense the light of the reversing light and begin to work. The rear vehicle lamp signal sensing module will send a signal to the wireless camera module and also send a signal to the rear RF signal transceiver module. The wireless camera module receives the signal from the rear vehicle lamp signal sensing module and begins to work. The wireless camera module will send the image to the video wireless receiving module, the rear RF signal transceiver module will receive the signal from the rear vehicle lamp signal sensing module and begin to work. The rear RF signal transceiver module sends a signal to the front RF signal transceiver module, the front RF signal transceiver module begins to work after receiving the signal from the rear RF signal transceiver module. The front RF signal transceiver module sends a signal to the video wireless receiving module and also the front RF signal transceiver module sends a signal to the display module, the video wireless receiving module begins to work after receiving the signal from the front RF signal transceiver module. The video wireless transceiver module sends the image to the display module. The display module will begin to work after receive the image from the front RF signal transceiver module. The display module also begins to work after receiving the signal from the video wireless transceiver module and the image is then displayed. In a second condition, as shown in FIG. 9, the RF control transmitting module sends a signal to the rear RF signal transceiver module, the rear RF signal transceiver module begins to work after receiving the signal from the RF control transmitting module. The rear RF signal transceiver module sends a signal to the wireless camera module and the rear RF signal transceiver module sends a signal to the front RF signal transceiver module. The wireless camera module begins to work after receiving the signal from the rear RF signal transceiver module. The wireless camera module sends the image to the video wireless receiving module, and the front RF signal transceiver module begins to work after receiving the signal from the rear RF signal transceiver module. The front RF signal transceiver module sends a signal to the display module, and the video wireless receiving module begins to work after receiving the signal from the front RF signal transceiver module. The video wireless receiving module begins to work after receiving the image form the wireless camera module. The video wireless receiving module will then send the image to the display module. The display module will begin to work after receiving the image from the front RF signal transceiver module. The display module will begin to work after receiving the image from the wireless camera module and image is then displayed on the display module. In a third condition, as shown in FIG. 10, the RF control transmitting module sends a signal to the front RF signal transceiver module, the front RF signal transceiver module begins to work after receiving the signal from the RF control transmitting module. The front RF signal transceiver module sends a signal to the rear RF signal transceiver module and sends a signal to the wireless camera module. The front RF signal transceiver module sends a signal to the display module. The rear RF signal transceiver module begins to work after receiving the signal from the front RF signal transceiver module. The rear RF signal transceiver module sends a signal to the wireless camera module. The wireless camera module begins to work after receiving the signal from the rear RF signal transceiver module. The wireless camera module sends the image to the video wireless receiving module. The video wireless receiving module begins to work after receiving the signal from the front RF signal transceiver module. The video wireless receiving module begins to work after receiving the image form the wireless camera module. The video wireless receiving module will then send the image to the display module. The display module will begin to work after receiving the image from the front RF signal transceiver module. The display module will then begin to work after receiving the image from the wireless camera module and image is then displayed on the display module.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-functional vehicle rearview mirror for a vehicle having a front side and a rear side, comprising:
   a cover;
   a glass reflecting mirror face provided in the cover;
   a large sized liquid crystal display device, which comprises:
   a display module, which comprises:
   a large sized display screen which comprises a large sized displaying liquid crystal glass supported on said glass reflecting mirror face, said large sized display screen having a size smaller than that of said glass reflecting mirror face; and
   a large sized display driver board supported by said cover and electrically connected to said large sized display screen; and
   a retention frame provided underneath said large sized displaying liquid crystal glass;
   a high obscuration media supported at a rear side of said display module, said high obscuration media having a small window; and
   a small sized backlight module having a control circuit supported by said cover at a position behind said high obscuration media and aligning with said small window, said small sized backlight module being arranged to selectively emit light toward said large sized displaying liquid crystal glass through said small window,
   said multi-functional vehicle rearview mirror operating between a normal mode and a backing mode, wherein in said normal mode, said large sized display driver is deactivated, while said small sized backlight module is activated to emit light toward said large sized displaying liquid crystal glass through said small window and said high obscuration media to form a small size image on a corresponding portion of said large sized displaying liquid crystal glass,
   wherein in said backing mode, said large sized display driver board is activated to generate a dominate image on said large sized display screen.

2. The multi-functional vehicle rearview mirror, as recited in claim 1, further comprising a rear light sensor provided on said cover at a position facing said front side of said vehicle, and a front light sensor provided on said cover at a position facing a rear side of said vehicle.

3. The multi-functional vehicle rearview mirror, as recited in claim 2, wherein said glass reflecting mirror face comprises a pure transparent glass which is supported by said cover and face toward a rear side of said vehicle, a glass layer coated with a reflecting membrane of a predetermined reflectivity supported by said cover and facing a front side of said vehicle, and a chemical media disposed between said pure transparent glass and said glass layer coated with said reflecting membrane, said chemical media being highly transparent when not connected to electricity, and highly reflective when connected to electricity.

4. The multi-functional vehicle rearview mirror, as recited in claim 3, further comprising a video control arrangement which comprises a control center module and a vehicle lamp signal sensing module electrically connected to said control center module, said vehicle lamp signal sensing module being arranged to sense a left turning light signal, a right turning light signal, an upper beam lighting signal, and a reversing light signal.

5. The multi-functional vehicle rearview mirror, as recited in claim 4, wherein said video control arrangement further comprises a plurality of cameras mounted on a front portion of said vehicle, a rear portion of said vehicle, a front left portion of said vehicle, a rear left portion of said vehicle, a front right portion of said vehicle, a rear right portion of said vehicle, a left portion of said vehicle, and a right portion of said vehicle respectively, said camera electrically connected to said control center module of said video control arrangement.

6. The multi-functional vehicle rearview mirror, as recited in claim 5, wherein said video control arrangement further comprises a video shift module electrically connected to said control center module for selectively operating at least one of said cameras and controlling a shift between a video image captured from said corresponding camera, and displayed on said large sized displaying liquid crystal glass.

7. The multi-functional vehicle rearview mirror, as recited in claim 6, wherein said video control arrangement further comprises a radio frequency control module which is electrically connected to said control center module, and comprises a plurality of press buttons each corresponding to a corresponding camera, such that when one of said pressed button is actuated, said corresponding camera is activated to capture a video, said video being shown on said large sized displaying liquid crystal glass.

8. The multi-functional vehicle rearview mirror, as recited in claim 7, wherein said video control arrangement further comprises a video composing module electrically connected to said control center module, and arranged to compose images captured from at least one said cameras to from one single integrated image which is displayed on said large sized displaying liquid crystal glass.

* * * * *